US008255598B2

(12) United States Patent
Carozza et al.

(10) Patent No.: US 8,255,598 B2
(45) Date of Patent: Aug. 28, 2012

(54) METHOD AND APPARATUS FOR MANAGING ITEM SEQUENCE NUMBERS IN AN ITEM PROCESSING SYSTEM

(75) Inventors: Nicholas Carozza, El Sobrante, CA (US); Ronald Hollander, Walnut Creek, CA (US); Eric Sandoz, Concord, CA (US)

(73) Assignee: Bank of America Corporation, Charlotte, NC (US)

( * ) Notice: Subject to any disclaimer, the term of this patent is extended or adjusted under 35 U.S.C. 154(b) by 2041 days.

(21) Appl. No.: 10/905,249

(22) Filed: Dec. 22, 2004

(65) Prior Publication Data
US 2006/0133277 A1   Jun. 22, 2006

(51) Int. Cl.
*G06F 13/00* (2006.01)
*G06Q 40/00* (2012.01)

(52) U.S. Cl. ............... 710/52; 710/34; 710/59; 710/32; 235/379

(58) Field of Classification Search .................... 710/34, 710/59, 32, 14; 235/379
See application file for complete search history.

(56) References Cited

U.S. PATENT DOCUMENTS

| | | | |
|---|---|---|---|
| 4,555,617 A | 11/1985 | Brooks et al. | |
| 6,041,374 A * | 3/2000 | Postman et al. | 710/73 |
| 6,115,509 A * | 9/2000 | Yeskel | 382/309 |
| 7,584,125 B2 * | 9/2009 | Vicknair et al. | 705/35 |
| 7,937,307 B1 * | 5/2011 | Vicknair et al. | 705/35 |
| 7,996,312 B1 * | 8/2011 | Beck et al. | 705/42 |
| 2002/0184151 A1 * | 12/2002 | Maloney | 705/45 |
| 2003/0103460 A1 * | 6/2003 | Kamath et al. | 370/236.2 |
| 2003/0135579 A1 * | 7/2003 | Han et al. | 709/215 |
| 2004/0062431 A1 * | 4/2004 | O'Neill | 382/137 |
| 2004/0257856 A1 * | 12/2004 | Liu | 365/154 |

* cited by examiner

*Primary Examiner* — Ernest Unelus
(74) *Attorney, Agent, or Firm* — Michael A. Springs; Moore & Van Allen PLLC; James C. Edwards

(57) ABSTRACT

Method and apparatus for managing item sequence numbers in an item processing system. The invention provides for overrun prevention and management of item sequence numbers, which form a part of an image key. In example embodiments, a buffer is provided to determine how close a current item sequence number (ISN) is permitted to be to an overrun value. When the current ISN reaches the buffer value, new entries of documents are prevented or at least restricted from being processed. In some embodiments, a "force mode" is provided in which a sorter can be made to start a new entry even if the buffer value has been exceeded. In such an embodiment, the system can be set up so that a hard stop is enforced when the ISN is within a certain range of the overrun value.

18 Claims, 9 Drawing Sheets

---

800

SORTER: 05         MISN SORTER ISN STATUS DISPLAY         NODE:BCF0016
FORCE MODE IS OFF                                          OPER ID:ES

| CYC | CYC-DT | CURRENT ISN | START ISN | ITEMS | BUFFER ISN | HRD STOP ISN | MOD | STAT |
|---|---|---|---|---|---|---|---|---|
| 0 |        | 0560712956 | 0560000002 | 000000 | 0560900002 | 0560990002 | 9 | HS |
| 1 | 071403 | 0560712956 | 0560245225 | 000000 | 0560145225 | 0560234225 | 2 | HS |
| 2 | 071503 | 0560712956 | 0560075433 | 000000 | 0560975432 | 0560065432 | 1 | HS |
| 3 | 071603 | 0560712956 | 0560988388 | 175432 | 0560888388 | 0560978388 | 1 | OK |
| 4 | 071003 | 0560712956 | 0560424574 | 000000 | 0560324574 | 0560414574 | 4 | HS |
| 5 | 071103 | 0560712956 | 0560376875 | 000000 | 0560276875 | 0560366875 | 3 | HS |
| 6 |        | 0560712956 | 0560000002 | 000000 | 0560900002 | 0560990002 | 9 | HS |
| 7 |        | 0560712956 | 0560000002 | 000000 | 0560900002 | 0560990002 | 9 | HS |
| 8 |        | 0560712956 | 0560000002 | 000000 | 0560900002 | 0560990002 | 9 | HS |
| 9 |        | 0560712956 | 0560000002 | 000000 | 0560900002 | 0560990002 | 9 | HS |
| A |        | 0560712956 | 0560000002 | 000000 | 0560900002 | 0560990002 | 9 | HS |
| B |        | 0560712956 | 0560000002 | 000000 | 0560900002 | 0560990002 | 9 | HS |
| C |        | 0560712956 | 0560000002 | 000000 | 0560900002 | 0560990002 | 9 | HS |
| D |        | 0560712956 | 0560000002 | 000000 | 0560900002 | 0560990002 | 9 | HS |
| E |        | 0560712956 | 0560000002 | 000000 | 0560900002 | 0560990002 | 9 | HS |
| F |        | 0560712956 | 0560000002 | 000000 | 0560900002 | 0560990002 | 9 | HS |

STAT=OK, BE=BUFFER EXCEEDED, OR, HS=HARD STOP EXCEEDED ——802
PF3=RETURN, PF7=PAGE BACK, PF8=PAGE FORWARD, PF10=TOP, PF11=BOTTOM

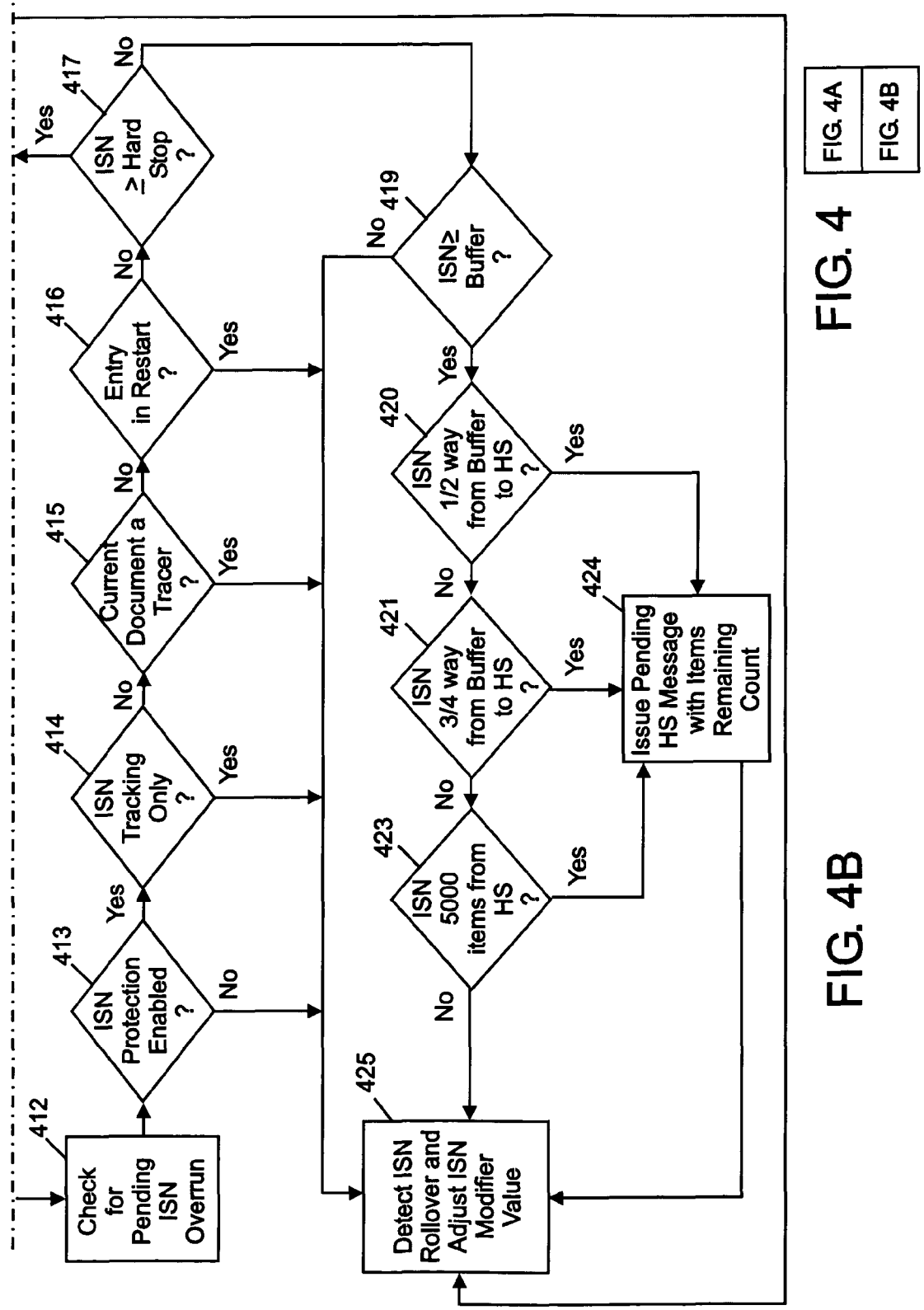

FIG. 8

SORTER: 05     MISN SORTER ISN STATUS DISPLAY     NODE:BCF0016
FORCE MODE IS OFF     OPER ID:ES

| CYC | CYC-DT | CURRENT ISN | START ISN | ITEMS | BUFFER ISN | HRD STOP ISN | MOD | STAT |
|---|---|---|---|---|---|---|---|---|
| 0 |        | 0560712956 | 0560000002 | 000000 | 0560900002 | 0560990002 | 9 | HS |
| 1 | 071403 | 0560712956 | 0560245225 | 000000 | 0560145225 | 0560234225 | 2 | HS |
| 2 | 071503 | 0560712956 | 0560075433 | 000000 | 0560975432 | 0560065432 | 1 | HS |
| 3 | 071603 | 0560712956 | 0560988388 | 175432 | 0560888388 | 0560978388 | 1 | OK |
| 4 | 071003 | 0560712956 | 0560424574 | 000000 | 0560324574 | 0560414574 | 4 | HS |
| 5 | 071103 | 0560712956 | 0560376875 | 000000 | 0560276875 | 0560366875 | 3 | HS |
| 6 |        | 0560712956 | 0560000002 | 000000 | 0560900002 | 0560990002 | 9 | HS |
| 7 |        | 0560712956 | 0560000002 | 000000 | 0560900002 | 0560990002 | 9 | HS |
| 8 |        | 0560712956 | 0560000002 | 000000 | 0560900002 | 0560990002 | 9 | HS |
| 9 |        | 0560712956 | 0560000002 | 000000 | 0560900002 | 0560990002 | 9 | HS |
| A |        | 0560712956 | 0560000002 | 000000 | 0560900002 | 0560990002 | 9 | HS |
| B |        | 0560712956 | 0560000002 | 000000 | 0560900002 | 0560990002 | 9 | HS |
| C |        | 0560712956 | 0560000002 | 000000 | 0560900002 | 0560990002 | 9 | HS |
| D |        | 0560712956 | 0560000002 | 000000 | 0560900002 | 0560990002 | 9 | HS |
| E |        | 0560712956 | 0560000002 | 000000 | 0560900002 | 0560990002 | 9 | HS |
| F |        | 0560712956 | 0560000002 | 000000 | 0560900002 | 0560990002 | 9 | HS |

STAT=OK, BE=BUFFER EXCEEDED, OR, HS=HARD STOP EXCEEDED —802
PF3=RETURN, PF7=PAGE BACK, PF8=PAGE FORWARD, PF10=TOP, PF11=BOTTOM

METHOD AND APPARATUS FOR MANAGING ITEM SEQUENCE NUMBERS IN AN ITEM PROCESSING SYSTEM

BACKGROUND

Financial institutions have established various processes and associations related to the exchange of documents evidencing monetary transactions. Such documents have generally been encoded with magnetic ink so that information from the documents can be read by machine. Such documents have thus become known as magnetic ink character recognition (MICR) documents. Item processing and sorting systems have also been developed in which a check or similar MICR document has its image captured and stored electronically.

In a typical item processing environment, based on the read of the MICR data, items are sorted into pockets as "on-us" items or "transit" items. An on-us item is an item that is drawn on the financial institution doing the processing. On-us items will typically be forwarded to other locations within the financial institutions own franchise. Transit items are checks drawn on other financial institutions, and are pocketed for delivery to those institutions. Images are also stored and indexed for retrieval. Historically, these images have been used mainly for archival purposes; however, the image is gradually replacing the physical item for more and more purposes. For example, customers can retrieve images of their checks on-line as opposed to obtaining a copy of the actual paper item. Legislation has also been promulgated in some jurisdictions that will allow banks to reconcile accounts using electronic images instead of paper items. Thus, correct indexing and identification of images relative to corresponding MICR data can be very important.

In a modern, computerized item sorting facility, an item processing computer system controls the operation of a sorter or sorters, and the storage of data and images. Images are stored in a check image archive. Each image is indexed according to an image key which typically includes the date, sorter information, and an item sequence number (ISN). In a typical system the ISN is restricted to a specific number of digits or places. Thus, when the number of checks to be processed on a sorter in one day (also called a "cycle") includes more than the number that can be counted with that number of digits, the ISN will begin to repeat, resulting in duplicate keys, mismatched images and other errors which disrupt the sorting operation.

SUMMARY

Embodiments of the present invention provide for overrun prevention and management in an item processing system. In example embodiments, a buffer size is determined, wherein the buffer size is indicative of how close a current item sequence number (ISN) is permitted to be to an overrun value. The buffer size can be set by user input, either in real-time, or in advance. In the latter case the buffer size would be stored and read by the system software in order to calculate an ISN buffer value. A fixed buffer size may also be built into the system. When the current ISN reaches the ISN buffer value, new entries (stacks or batches) of documents will be prevented or at least restricted from being processed. It should be noted that in a typical system, a new cycle or day's entries of documents does not necessarily start with an ISN of zero, but may start with the ISN value corresponding to the end of the last cycle. Thus, a rollover of the ISN can be permitted, but not an overrun, wherein an ISN occurs that was previously used in the same cycle. Since other portions of the image key change with each new cycle, item sequence numbers from the last cycle can be re-used.

In some embodiments, a "force mode" is provided in which a sorter can be made to start a new entry even if the ISN buffer value has been exceeded during a cycle. In such an embodiment, the system can be set up so that the force mode is not available when the ISN is within a certain range of the overrun value. In such an embodiment, a hard stop value for the ISN is calculated based on the known overrun value and this desired "hard stop" range. The hard stop range can be stored in the system and/or entered by a user in a similar manner to that of the buffer size. In some embodiments, status indications and/or hard stop warnings can be provide to users via an attached user interface or terminal.

In at least some embodiments, internal calculations of buffer values, hard stop values, and status information are facilitated by the use of a modified ISN. Since the ISN is a portion of an image key that is defined and recognized by banks according to agreed standards, it typically cannot be changed. However, a modified ISN can be created and used internally by an item processing system in order to facilitate calculations. In example embodiments, the modified ISN includes the standard ISN and an ISN modifier. The ISN modifier provides an indication of how the ISN is positioned in relation to its rollover value, and can be used for calculations. The ISN modifier is maintained internally to the system in a fashion similar to that of the buffer size, hard stop range, and other numerical data needed for operation. In a practical system, this data can be maintained in a computer readable memory system in an ISN control file (ICF) and/or an ISN memory area (IMA). A MICR subsystem within the item processing system can house some or all of the computer program code instructions necessary to carry out embodiments of the invention using this data. Such computer program code instructions can be stored and transported as part of a computer program product. In such an embodiment, the memory system, MICR subsystem, user terminals, and other computing resources can provide the means for carrying out the processes of the invention.

BRIEF DESCRIPTION OF THE DRAWINGS

FIGS. 4A and 4B show another more detailed logic flowchart illustrating at least an portion of an example embodiment of the invention.

FIG. 8 is a screen shot illustration of a status information screen that might be presented to users of an item sorting system according to example embodiments of the invention.

DETAILED DESCRIPTION

Figure 1:
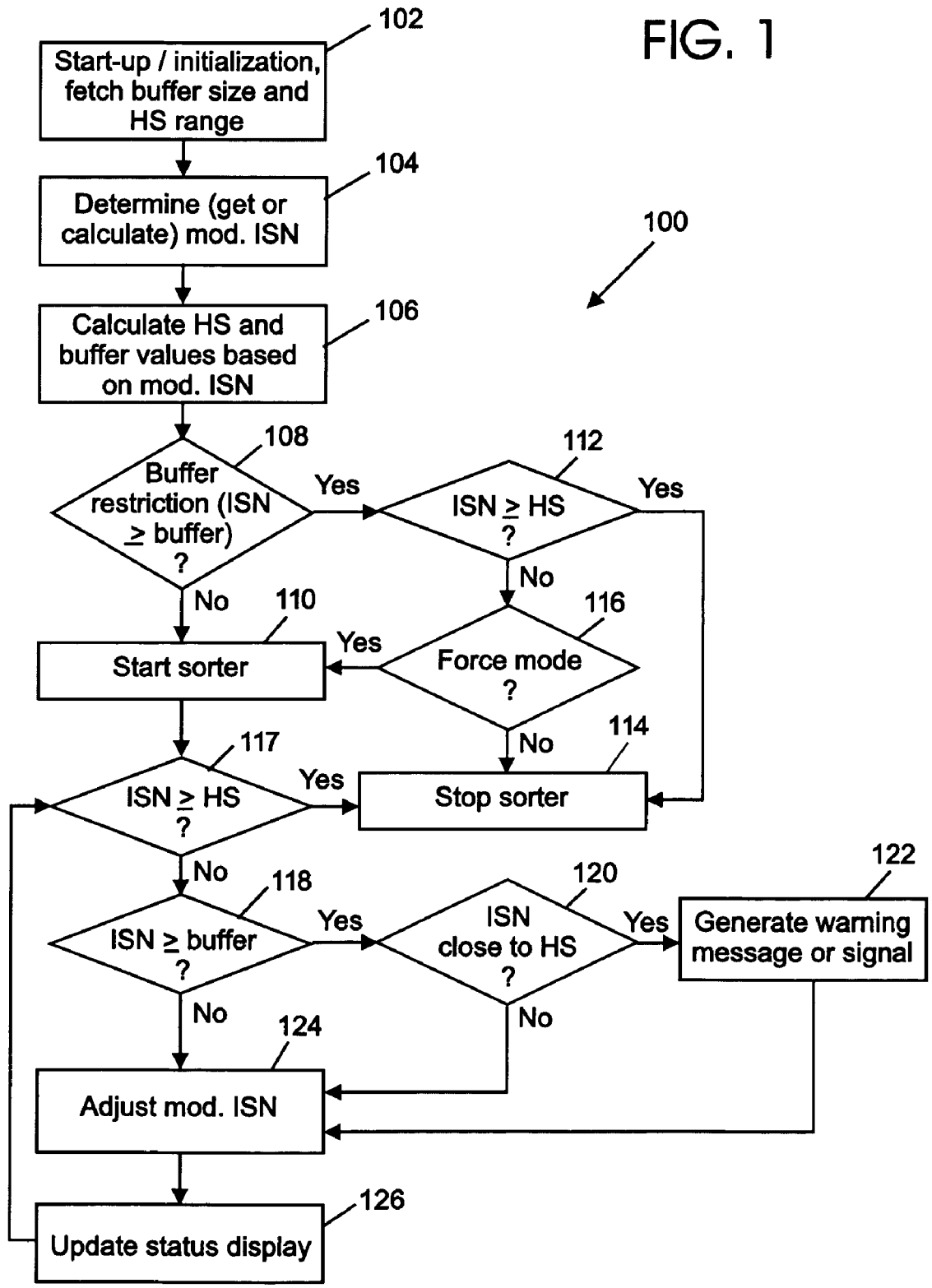
FIG. 1 is a flowchart illustrating the high-level process according to example embodiments of the invention.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. In addition, throughout this disclosure, where a process or method is shown or described, the steps of the method may be performed in any order or simultaneously, unless it is clear from the context that one step depends on another being performed first. Also, time lags between steps can vary. With respect of flow charts, block diagrams and flow diagrams, not every possible signal flow, data path, or process block is shown. Rather, for clarity, only those important to the inventive concepts being discussed relative to the drawing may be illustrated, although others may be discussed in this description.

The meaning of certain terms as used generally in the context of this disclosure should be understood as follows. Terms such as "document," "item" or "check" and the like are meant to refer to any document which tends to be handled and sorted in large volumes based on MICR information printed thereon. In the typical context, such documents are checks which order a bank to pay a certain sum to the order of another individual or entity. However, other documents evidencing financial transactions relating to banking, and for that matter, other kinds of documents, can be processed according to the invention. Even in the typical banking context for example, deposit slips are sometimes MICR encoded, and could be read, sorted, and imaged in a fashion similar to checks. Thus, a system which processes such documents can be referred to as an item processing system, a check processing system, or a document processing system.

The term "bank" and any similar terms are used herein in their broadest sense. Financial institutions that process transactions and documents of the types discussed can include stock brokerages, credit unions, and other types of institutions which are not strictly banks in the historical sense. The use of terms such as bank, "institution" or "franchise" herein is meant to encompass all such possibilities.

Much of the terminology herein refers to the processing of information about MICR encoded documents. This information can be stored in a data processing system, in computer memory and media for retrieval and manipulation. There are many ways to design a system to accommodate the storage of this information, as well as the storage of electronic images of documents such as checks. In example embodiments, this terminology refers to information stored in what is commonly known as a "check image management system" (CIMS) and within a "check processing control system" (CPCS). Such systems are well known within the banking industry by those who work in the financial data processing fields. Such data processing systems have historically been produced by the International Business Machines (IBM) Corporation. CPCS is still produced by IBM, while CIMS is today produced and marketed by Carreker Corporation of Dallas, Tex., U.S.A. Through the use of such systems, check images and index information referring to the check images, which typically includes the MICR data, can be stored according to any of various industry standard formats, such as the "common import format file" (CIFF). Such systems have been used for many years by many banks to archive check images. Images and index information in such a system can be stored in the same file or separated. In some environments, the index information is separated and stored in an electronic cash letter (ECL) for communicating between financial institutions for the purpose of settlement. Index information can also be stored with electronic images in an "image cash letter" (ICL) to provide for the truncation of the paper documents. Again, these systems and techniques are well known by those of ordinary skill in the financial information technology arts.

It should be assumed for example purposes that a CPCS system like that typically supplied by the International Business Machines Corporation is being used to implement the embodiments described herein. With such a system, a user can add software to the standard CPCS software through the use of user exit programs. A "user exit" within the software causes the standard CPCS software to trigger custom software installed by the user of the check processing system. This arrangement is well-known to those in the industry who use CPCS software. The logic described herein that implements item sequence number (ISN) management can be, in example embodiments, implemented in CPCS user exit programs.

Embodiments of the invention will now be described as follows. An overview of a process and system of embodiments of the invention will be described with reference to FIGS. 1 and 2. Throughout this initial description, further terminology specific to embodiments of the invention will be discussed and introduced. More specifically, detailed flow logic for embodiments of the invention will then be discussed, at least in part with reference to FIGS. 3 through 6. A more detailed system block diagram emphasizing the software components of a specific example embodiment is then presented in FIG. 7. Finally, an example status information screen is illustrated in FIG. 8.

By way of further introduction, a standard CPCS system, when processing documents which are imaged, assigns a check image management system (CIMS) key to each item. This CIMS key, also referred to as simply an "image key" or a "key" includes a processing cycle number, a processing cycle date and an item sequence number (ISN). Processing cycles and entries have already been discussed. For example purposes, the ISN discussed herein includes a 6-digit rolling number that can be at any value when the processing cycle begins. If more than one million items are captured on a single sorter machine, the ISN will overrun the starting number, as previously discussed. It should be noted that the ISN of an image key actually can include an item type, sorter number, and region number as well as the six digit rolling number. In some circles, all of these items together are referred to as the ISN. For purposes of this disclosure, however, the concern is with the trailing, rolling, six digits, which can be treated as the "ISN" herein for discussion and illustrative purposes unless otherwise noted. Thus, the ISN as used herein, is relevant primarily on a sorter by sorter basis, since the CIMS key also includes a sorter number. It should be noted that the invention would be relevant no matter how many rolling digits are used in the ISN, any time the number of items to be processed on a sorter exceeds the number that can be accounted for by the ISN's available digits. At least some CPCS systems today allow for 8 rolling digits in the ISN.

Turning to FIG. 1, an overview of the process, 100, of embodiments of the invention is presented in flowchart form. As is typical with flowchart style diagrams, the process is presented as a series of process blocks or process elements. At element 102, a start-up and/or initialization process occurs whereby, among other things, a buffer size and hard stop (HS) range are fetched or input. At block 104, a modified item sequence number (ISN) is fetched or calculated. At block 106, a buffer value and hard stop (HS) value for the modified ISN are calculated.

The buffer size referred to above specifies a buffer representing the number of ISN's before the overrun value where entries will begin to be restricted from initial processing. For example, if the system can be set up so that beginning new entries is restricted when the ISN is within 100,000 of its overrun value, than the buffer size is 100,000. A buffer size of 100,000 is used as an example herein. However, note that a system can be set up so that entries can continue to run but not be started if it is known that all entries are smaller in size than this number. The HS range is similar, except that it specifies, in example embodiments, how many sequence numbers before the overrun value that entries will be completely blocked from either starting or running. For purposes of the examples presented herein, an HS range of 10,000 is used and all processing ceases at a hard stop. In example embodiments, the buffer value or simply the "buffer" for brevity is a calculated ISN which matches the current ISN when the number of items is within the buffer size of the overrun value. The HS value, or for brevity simply the "HS" is similar.

The ISN in the above calculations as viewed externally is simply the standard ISN. However, for the internal calculations, a modified item sequence number (ISN) can be used. The modified ISN is the current standard ISN adjusted internally for overrun calculation purposes. In example embodiments it consists of the ISN and an ISN modifier. In example embodiments, the ISN modifier is a value based flag to track the forward progress of an ISN in a specific cycle for a specific sorter. It provides context of where the ISN has been in relation to passing one million. It can be used to increase the current ISN internally by 1,000,000 during calculations for a 6-digit ISN, by 10,000,000 for a 7-digit ISN, by 100,000,000 for an 8-digit ISN, etc. In the example embodiments, the numerical values discussed above, as well as additional information needed for embodiments of the invention, can be semi-permanently stored in an ISN control file on a media as appropriate and loaded into an ISN memory area for use when sorting is actually taking place.

Returning to FIG. 1, at element 108, an initial inquiry is made to see whether new entries are restricted because the modified ISN is greater than or equal to the buffer value. If not, the sorter starts at element 110. If so, a check is made to see if the modified ISN is greater than or equal to the HS value at element 112. If yes, the sorter is stopped (prevented from starting) at block 114. If not, an inquiry is made at element 116 to see if the force mode has been engaged. The sorter can be put in force mode by a person with appropriate authority, for example, if there is a need to override the normal restriction to get a small but important entry underway. If force mode is engaged, the sorter starts at block 110. Otherwise, the sorter is stopped at element 114 as previously discussed.

During operation, in this example embodiment, a modified ISN greater than or equal to the HS value as shown at block 117 will stop the sorter. Also, during operation, a modified ISN greater than or equal to the buffer value as shown at element 118 will trigger sub-process or element 120 which can issue a warning message at block 122 if the modified ISN is close to the HS value. The ISN and the modified ISN are continuously adjusted as needed during sorting at element 124. A status information display can also continuously updated in this example as shown at element 126. Note that the numerical tests specified above are expressed as "greater than or equal to" tests. The system can also be set up to use "greater than" tests and the latter is considered herein to encompass both possibilities.

Figure 2:
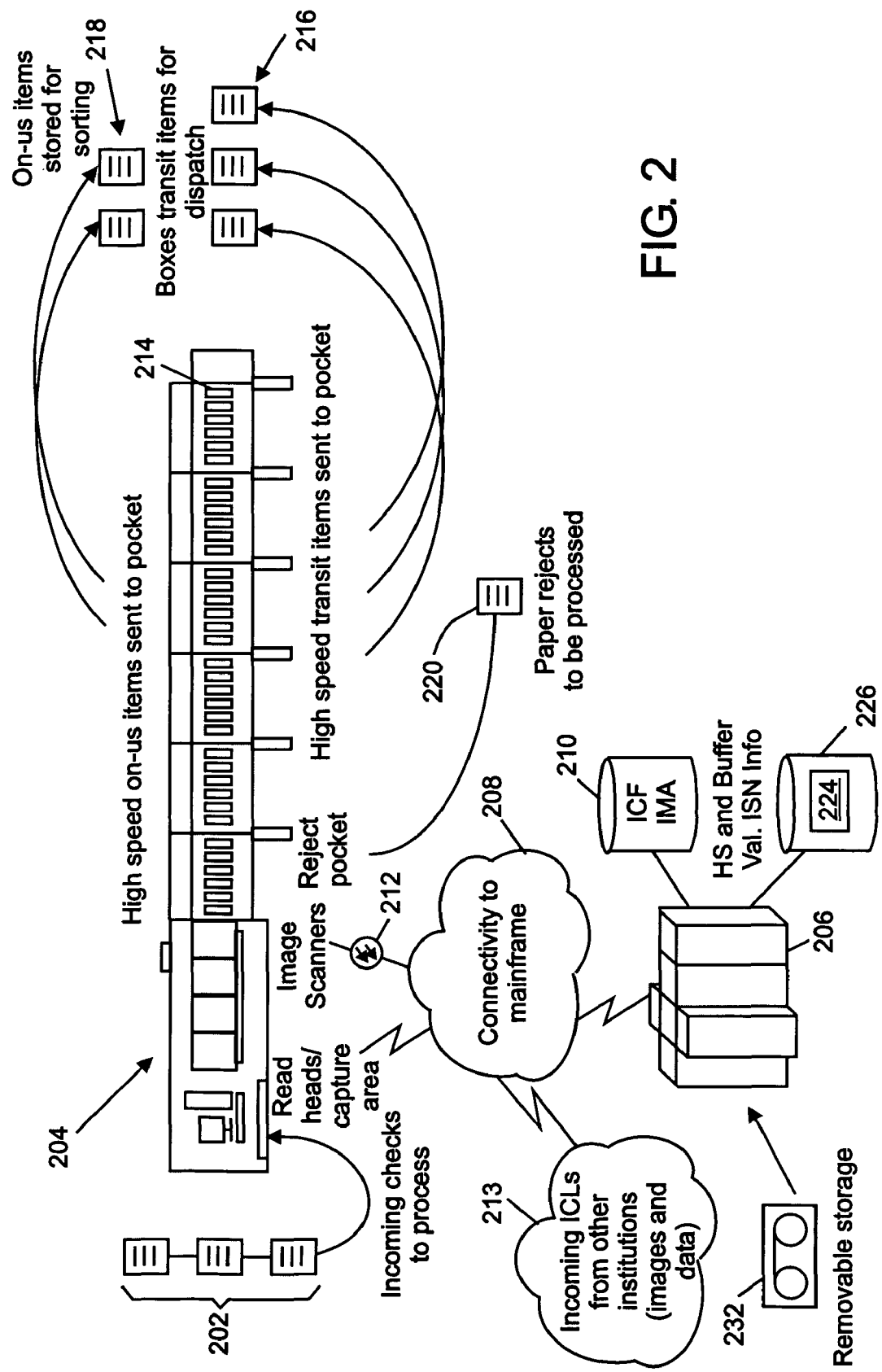
FIG. 2 is a schematic diagram of an item sorting facility which shows the operating environment of an example embodiment of the invention.

FIG. 2 is a high-level, example block diagram of a typical sorting facility implementing an embodiment of the invention. Incoming paper items, in this case checks, are shown at 202. The documents are sorted and read at a high-speed sorter, 204, for example, an IBM® 3890 high-speed sorter. The checks pass through a capture area where read heads capture the MICR data and organize it into stored data fields. This data is transmitted to computer system 206 via connectivity 208. This connectivity can theoretically be provided by any of various types of networks. In this specific example, for an IBM 3890/XP sorter, communication with the CPCS computing system can be by TCP/IP local area network (LAN), LU6.2 SNA or LAN, or direct or extended channel connection. Computing system 206 stores the MICR data and any other required data on computer memory system 210, which can be storage media, electronic memory, or a combination of the two. This data can include the ISN control file (ICF) and/or the ISN memory area (IMA) previously discussed, which in example embodiments include modified ISN information, and buffer and HS values.

In the example of FIG. 2, electronic images 212 are captured, forwarded to the computing system and stored. The receipt of images from other financial institutions in the form of industry standard image cash letters (ICL's) 213 is also supported. Such files typically include both images and data. High-speed sorter 204 sorts all items which can be sorted, and routes the items into pockets 214. The sorting process allows items to eventually be packaged for movement to appropriate areas. In the example of FIG. 2, boxed transit items are shown at 216 and boxed on-us items are shown at 218. Items which cannot be routed, for example paper rejects 220, that generate errors when read are routed to a low-speed document processor (not shown), manually read and/or corrected, or otherwise exception processed. The user exit programs, custom or standardized sorting software and other software necessary to implement an embodiment of the invention can reside in the form of computer program code 224, at least in part stored in and read from fixed storage 226.

It cannot be overemphasized that the system of FIG. 2 is provided as an illustrative example only. Other types of document sorting machines that can be used to provide the sorting/capture/imaging functions. Most sorters typically have conventional document diverting mechanisms which route the documents to the various pockets. Sorting instructions to cause the documents to be routed are received from a processor within the sorting machine, or from an external computing platform, or sometimes both depending on the particular operations being carried out at any particular time. The computing platform can be a mainframe, server, workstation, and even a desktop or personal computer given the processing power that has been achieved in such devices in recent years.

Some embodiments of the invention can be implemented through extensive use of computer program products, or computer program instructions to carry out methods according to the invention. These instructions in combination with a computing platform processor and other devices form the means to carry out embodiments of the invention. These computer program instructions may be part of a computer program or multiple programs which are supplied as a computer program product. Such a computer program product may take the form of a computer readable media that allows computer program instructions to be loaded into computing platforms. In the example operating environment of FIG. 2, a computer program product in the form of a medium containing the appropriate instructions is shown as removable storage medium 232.

Computer programs which implement embodiments of the invention can reside on any medium that can contain or store the program for use by or in connection with any computing platform or instruction execution system, apparatus, or device. The medium may be, for example but not limited to, an electronic, magnetic, optical, electromagnetic, or semiconductor system or device. For example, the computing platform, storage mediums, connectivity, and sorting machine, can all be combined into one large device and the computer program instructions could be stored within an optical, magnetic, or electronic module type storage devices.

Much of the remainder of this detailed description will illustrate details of how to implement an embodiment of the invention using CPCS user exit programming. Again, it cannot be overemphasized that this material is presented as an example only in order to fully enable the invention. Software and systems can be architected in numerous ways in order to create an embodiment of the invention that is within the spirit and scope of the appended claims.

In example embodiments of the sequence number management system, startup user exit programming allocates memory for the system information and establishes addressability to the memory area so other programs running in the CPCS address space can find the information. The programming then verifies that no changes have occurred in relation to the sorters defined to the CPCS. If changes were made, the ISN control file is recreated to include accurate sorter information. The ISN memory area is then populated and if necessary, the ISN control file is built or rebuilt. The ISN memory area is populated using data from the ISN control file, and other standard CPCS data, such as the data in the image sequence file and CPCS MICR control blocks.

In example embodiments, the following data maintained in the ISN control file:
  System Status
  Site Name
  Entry Start Buffer Value
  ISN Hard Stop Value
  Number of Sorters Defined to Site
  One of the following for each sorter:
  Sorter Number
  Binary Sorter Number
  Sorter Force Flag
  ISN Rollover Flag
  One of the following for each cycle (cycles 0 through F):
  Cycle Number
  Cycle Date
  Cycle Starting ISN
  ISN Modifier In example embodiments, the following data maintained in the ISN memory area:
  System status
  Site Name
  Entry Start Buffer Value
  Hard Stop Value
  Number of Sorters Defined to Site
  Logical ID of Last Sorter Defined
  One of the following for each sorter:
  Sorter Number
  Binary Sorter Number
  Sorter Force Flag
  ISN Tracking Mode
  ISN Rollover Flag
  First Entry ISN
  Current ISN
  One of the following for each cycle (cycles 0 through F):
  Cycle Number
  Cycle Date
  First Entry Flag
  ISN Modifier
  Cycle Starting ISN
  Cycle Starting ISN minus 1
  Calculated Buffer ISN value
  Calculated Hard Stop ISN value In example embodiments, a sorter operator typically enters or verifies information at a user screen on an attached terminal. This information includes sorter information, the type of documents to be processed, etc. The system read routine performs start of entry validation based on the ISN the sorter plans to use to begin the entry. If an ISN overrun condition is near, the read routine will prevent the sorter operator from starting the new entry unless force mode has been engaged and the HS value has not been surpassed. The read routine also manages ISN tracking for the sorter when a new entry begins.

Figure 3:
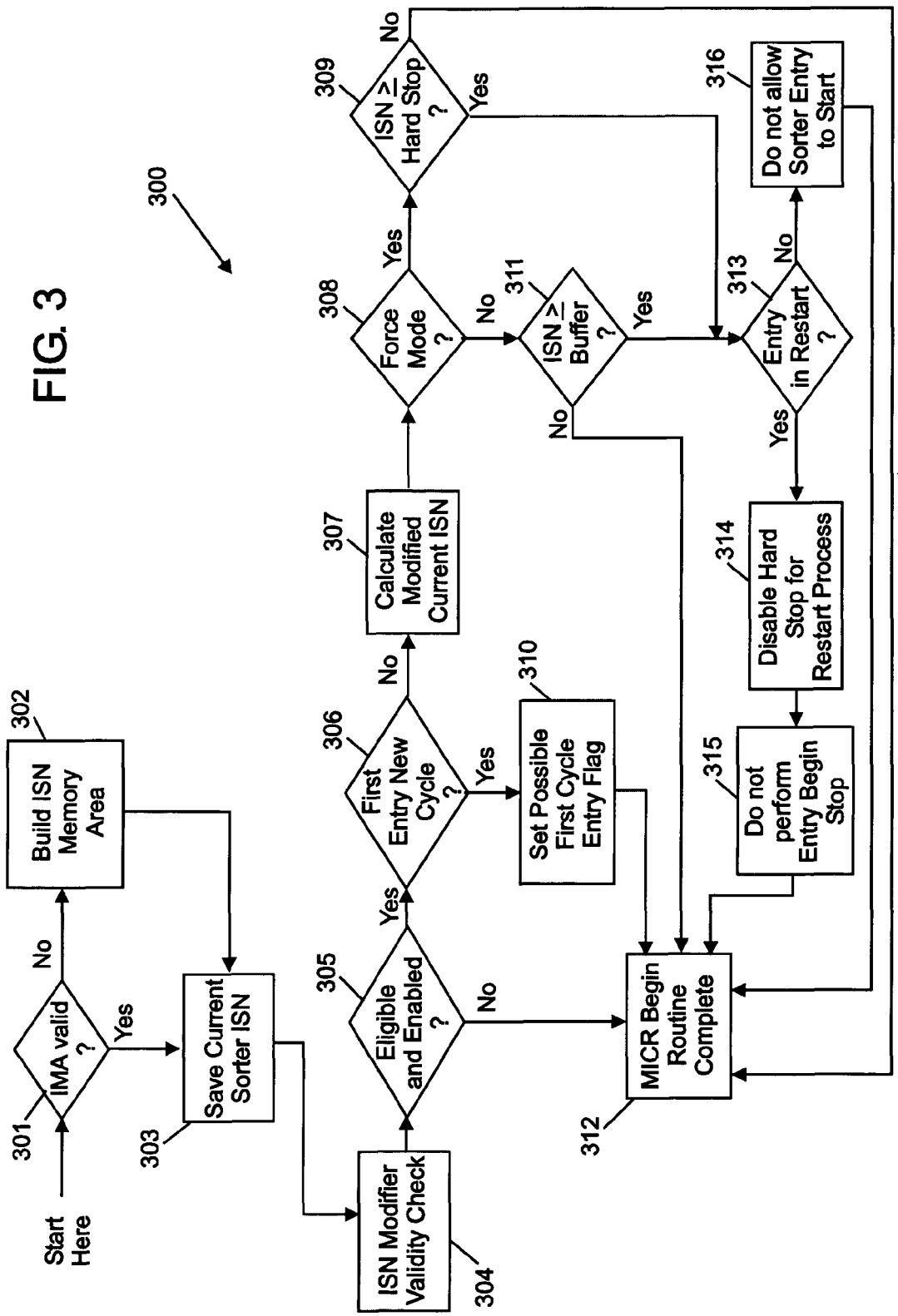
FIG. 3 is a more detailed logic flowchart illustrating at least a portion of an example embodiment of the invention.

FIG. 3 illustrates some details of a begin logic flow, 300, in this example embodiment of the invention. Element 301 verifies that the ISN memory area is available and valid. If the memory area is not valid, element 302 will create the ISN memory area. Element 303 saves the current ISN of the sorter in question. Element 304 performs a validity check on the ISN modifier for this sorter and cycle in case the ISN has changed and increased past or decreased past the one million point outside of the system's visibility. Element 305 verifies that the system ISN overrun protection according to embodiments of the invention is enabled and that this entry is eligible for this protection. For example, non-image documents may not be eligible since CIMS and CIMS keys might not be used. Additionally, in some systems, the use of the ISN overrun protection may be limited to "prime" or "prime pass" entries. Such an entry is understood by those of skill in the art to be a first pass of items. This terminology is used to distinguish an entry from those in which items are passed through the system for a second time when there are not enough pockets to handle the items of an entry in one pass.

Since the current entry may be the first entry of a new cycle, element 306 performs a check for a new processing cycle on this sorter. If the date of the cycle has changed, then a flag will be set to indicate a possible new cycle. Note that a cycle could be initiated with tracer tickets, documents that are not real documents but rather items to be read by the sorter to enter data in the system. A new cycle cannot be confirmed at this point because real items must be processed through the sorter. If this entry does not represent a possible new cycle, element 307 determines the current modified ISN (the current ISN with the ISN modifier applied in the millions position). Element 308 checks the force mode status. If the sorter is in force mode, an entry will be allowed to start if the modified current ISN is beyond the buffer value ISN. In these example embodiments, force mode will not allow the entry to start if the modified current ISN is greater than the hard stop value ISN. If force mode is enabled, processing proceeds to element 309 to determine if the modified current ISN is greater than the hard stop ISN. Note that if the date of the cycle had changed at element 306, a first cycle entry flag would have been set at element 310.

If the sorter is not in force mode for logic 300, the modified current ISN is reviewed to see if it is less than the buffer value at block 311. Note that if the system is in "restart" (being re-initialized after any kind of suspension of processing during an entry, including, but not limited to a planned suspension, a crash or a power failure) at block 313, the hard stop is disabled at element 314 and the entry begin process stops at block 315 when HS processing is disabled. If the system is not in restart at block 313, then the entry will be prevented starting at element 316. Otherwise, HS processing will be disabled for the restart and allow the entry to continue.

The ISN modifier validity check referred to at element 304 of FIG. 3 tests for the following conditions:
(1) ISN rolled past one million outside of modified ISN visibility;

(2) ISN rolled past one million outside of MICR (or possibly CPCS) with a CPCS "bounce," that is, the ISN memory area does not reflect the previous entry;

(3) ISN ran over one million in a null entry during tracer processing, where the modified ISN incremented the ISN Modifier, but now the entry is starting at an ISN less than one million, so that the ISN modifier must be reset to prevent a double increment;

(4) CPCS has gone down in the middle of an entry and the restart fails, so that the CPCS image sequence file reflects the ISN prior to the entry involved (to be resolved with image system initialization procedures.

The final condition listed above reflects the fact that if the recovery is done outside of the restart mechanism, it will be outside the visibility of the modified ISN system. If a rollover occurs that either increments the ISN past or decrements the ISN past the rollover value, the ISN modifier will not be correct if the modifier is not adjusted for these events.

Logic for the modifier validity check referred to above can be implemented as follows. If this entry is a new entry and no other conditions have been detected, a "rollover during this entry" flag is reset. If a restart is in process the flag is not reset. To implement the above tests, the system determines if a "rollover during this entry" flag is on. If so, the current sorter ISN is stored as the current ISN. The last known ISN is retrieved from the ISN memory area and stored as the previous ISN. In example embodiments, a determination is made as to whether previous ISN is less than 300. If so, a determination is made as to whether the current ISN is greater than 999,000. If so, the ISN modifier is decremented if it is greater than 0 for all cycles of this sorter. The "rollover during this entry" flag is cleared and written to the ISN control file. A "rollover flag changed" indicator is set and the current MICR ISN is set up for the rest of the begin processing.

If the previous ISN was not less than 300 or the current ISN was not greater than 999,000, then a determination is made as to whether the current entry is a restart entry. If the entry is not in restart, a check is made for an ISN modifier equal to one. If the modifier is one, a determination is made as to whether the current ISN is greater than 900,000. If so, a determination is made to determine if the current ISN is greater than or equal to the cycle starting ISN. If the current ISN is greater than or equal to the starting ISN, a process to decrement the ISN modifier commences. Otherwise, another determination is made as to whether the entry is in restart. If not, the "rollover during this entry" flag is cleared and written to the ISN control file. A "rollover flag changed" indicator is set. If it was previously determined that the rollover flag was off, the current sorter ISN is obtained and set as the current ISN.

If the current ISN is less than 5000, the last known ISN from the ISN memory area is saved as the previous ISN. If the previous ISN is greater than 995,000, the system will increment all of the ISN modifiers that are less than nine. The system sets the "rollover during this entry" flag and saves the data to the ISN control file. A "rollover Flag changed" indicator is also set. If it is found that the current ISN was not less than 5000, it is again verified that the entry is not in restart. If the current ISN is less than 5000, a determination is made as to whether the cycle starting ISN is greater than the current ISN plus 5000. If so, the current cycle's ISN modifier for this sorter is set equal to zero, and the ISN modifier is incremented, the appropriate flags are set, and the data is saved to the ISN control file as previously described.

Figure 4A:
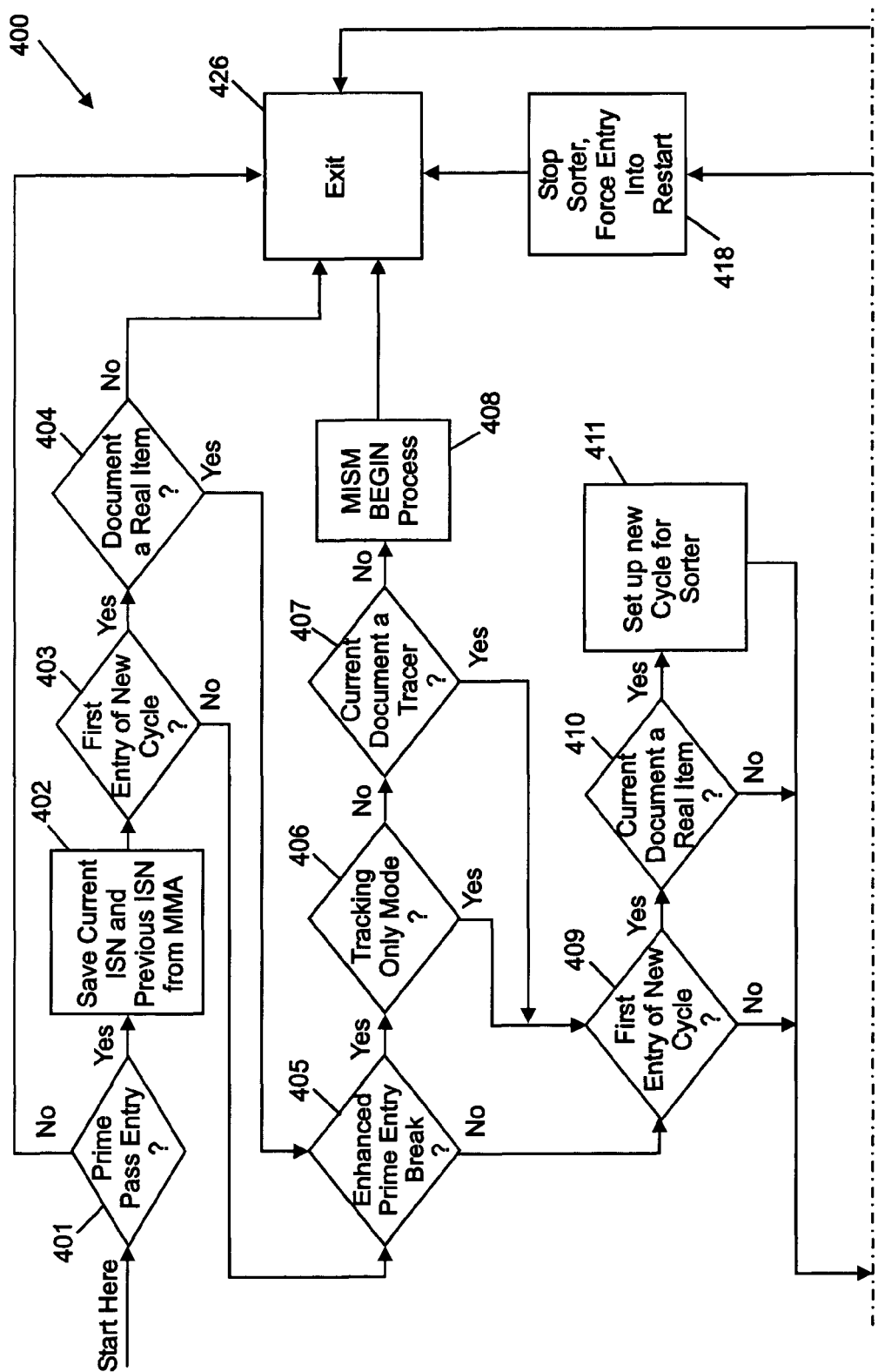

FIGS. 4A and 4B provide a logic flow diagram of the read logic routine, 400, according to an example embodiment of the invention. Element 401 verifies that this is a prime pass entry of a type eligible for modified ISN tracking and protection, as previously discussed. Element 402 saves the current sorter ISN and the previous ISN from the ISN memory area. Element 403 determines whether the "possible first entry of a new cycle" flag was set by the begin logic to see if new cycle processing needs to occur. If this entry is a possible first entry of a new cycle, element 404 verifies that a real item has been processed through the sorter as part of this entry. If not, the routine exits. If a real item had been captured, a determination as to whether an enhanced prime entry break is taking place is made at element 405. An enhanced prime entry break occurs when the sorter is directed to start a new entry by processing a set of tracer control documents without a begin process. that this is a prime pass entry of a type eligible for modified ISN tracking and protection, as previously discussed. Element 402 saves the current sorter ISN and the previous ISN from the ISN memory area. Element 403 determines whether the "possible first entry of a new cycle" flag was set by the begin logic to see if new cycle processing needs to occur. If this entry is a possible first entry of a new cycle, element 404 verifies that a real item has been processed through the sorter as part of this entry. If not, the routine exits. If a real item had been captured, a determination as to whether an enhanced prime entry break is taking place is made at element 405. An enhanced prime entry break occurs when the sorter is directed to start a new entry by processing a set of tracer control documents without a begin process.

If the system is at an enhanced prime entry break, a check is made for modified ISN tracking at element 406. In element 407, a determination is made to see if processing of real items has begun. If so, element 408 performs a modified version of the begin logic for the new entry. Otherwise, processing continues to element 409, where the first entry of a new cycle is verified. If the entry is the first of a new cycle, element 410 verifies that a real item has been processed through the sorter as part of this entry. If one has, the new cycle information is set up in the ISN memory area and in the ISN control file, as shown at element 411, and discussed in further detail below with respect to FIG. 5.

The modified version of the begin logic performed pursuant to element 408 of FIG. 4 checks the force mode status of the sorter. If the sorter is in force mode, then a determination is made as to whether the modified current ISN is greater than the HS value. If so, the system does not allow the new enhanced prime entry to start, but rather stops the sorter. If the sorter is not in force mode, a determination is made as to whether the modified current sorter ISN is greater than the buffer value ISN. If so, start of the new enhanced prime entry is prevented. Otherwise, the entry is allowed to start and the modified start routine is concluded.

Referring again to FIG. 4B, in element 412, the process to check for a pending ISN overrun begins. Element 413 verifies that modified ISN protection is enabled. Element 414 checks for whether a tracking mode is set. Element 415 determines if the current document is a tracer or real document. Element 416 verifies the entry is not in restart. Element 417 determines if the modified current ISN is greater than the HS value. If the modified ISN is greater than the HS value, then element 418 stops the sorter and forces the entry into a cancel required status. Otherwise, element 419 determines the modified current ISN is greater than or equal to the buffer value ISN. If it is greater, elements 420, 421, and 423 determine how close to a hard stop the sorter is and issue an appropriate warning message. In element 420 a check is made as to whether the modified ISN is more than half way from the buffer value to the HS value, and in element 421, the check is for three quarters of the way. Finally, element 425 detects an ISN rollover and adjusts the ISN modifier value, as discussed in further detail below with respect to FIG. 6. The program exit is designated in FIG. 4A as element 426.

Figure 5:
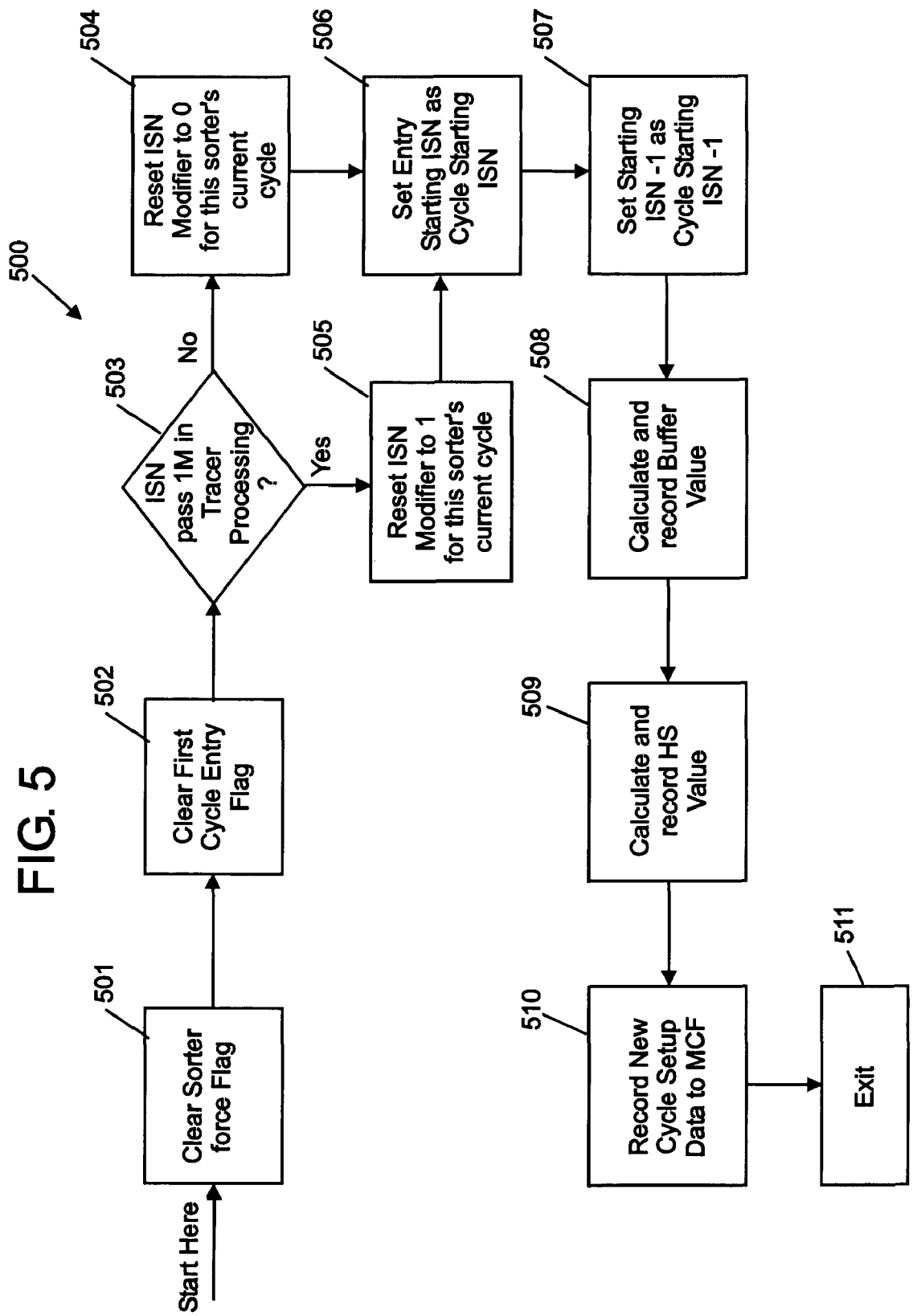
FIG. 5 is a further logic flowchart illustrating at least a portion of an example embodiment of the invention.

FIG. 5 is a flow diagram of logic 500 to setup the sorter for a new cycle. Setup begins with element 501 where the sorter force flag is cleared. Next, the possible first entry of a new cycle flag is cleared at element 502. At element 503, a check for the ISN passing one million during tracer processing of this entry is performed. Depending on the result, the ISN modifier is set to either zero at element 504 or one at element 505. The entry starting ISN is set as the cycle starting ISN at block 506. The "entry starting ISN −1" value is set at element 507. The buffer value ISN for the current cycle is calculated and stored at block 508. The HS ISN value for the current cycle is calculated and stored at block 509. Finally, the new cycle data is written to the ISN control file at element 510 and the process exits at block 511.

Figure 6:
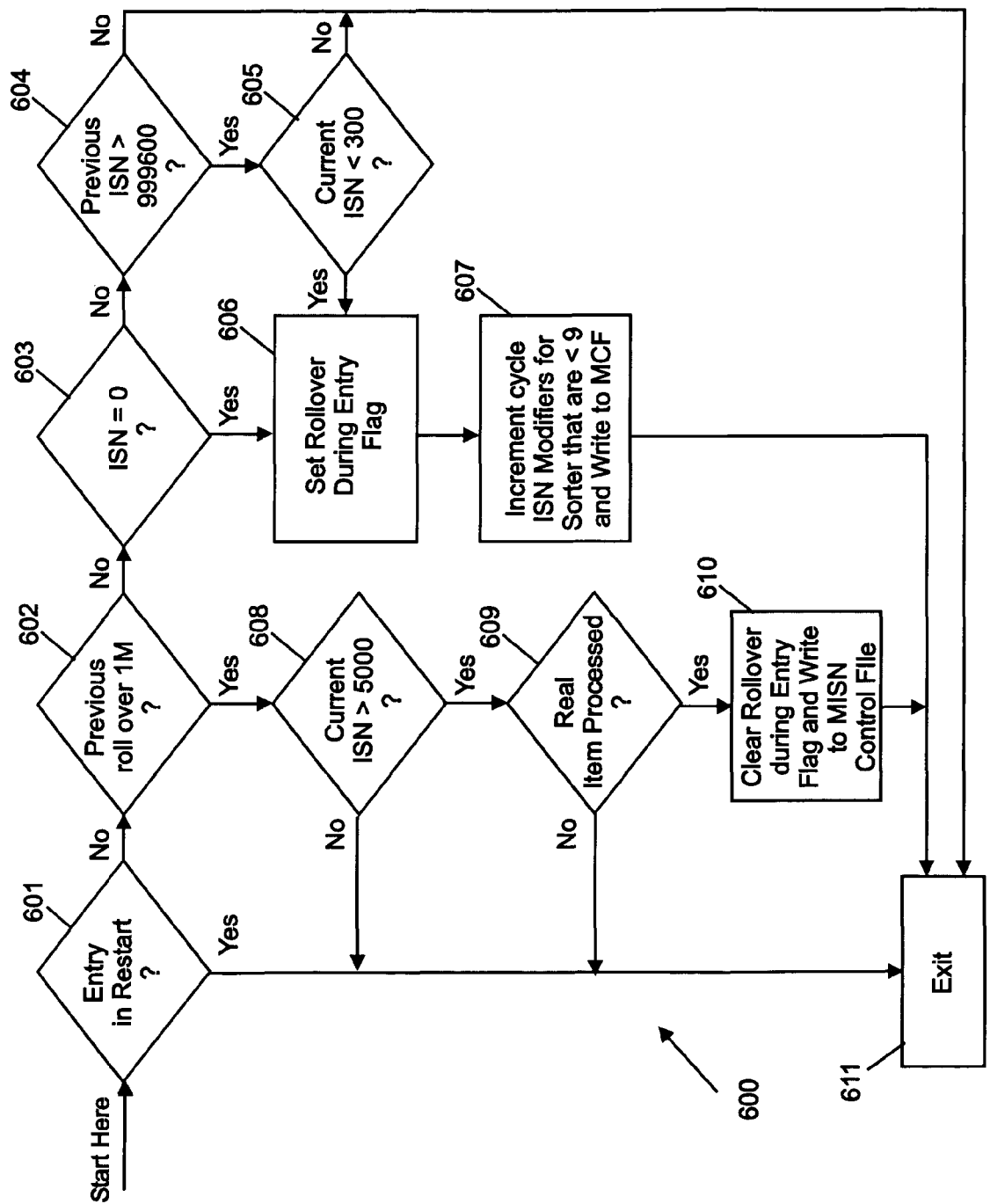
FIG. 6 is another logic flowchart illustrating at least a portion of an example embodiment of the invention.

FIG. 6 is a block diagram that describes logic 600, which detects an ISN rollover of one million and adjusts the ISN modifier value correctly. This routine will handle various conditions as follows:

(1) If the entry is in restart the system does not adjust for a rollover, rather a rollover will be handled during the first real document captured after the restart or in the next entry;
(2) If no rollover has occurred during this entry so far, and this is document ISN 0, then do a rollover, assuming that no single entry can contain more than one million items;
(3) If no rollover has occurred during this entry and this document is at ISN 300 or earlier and the last ISN reported was greater than 999,600 do a rollover to catch any sorter error at ISN 0 or a restart during ISN 0 that prevented the modified ISN code from processing the item with ISN 0;
(4) If the current ISN is greater than 5000 and the document is real, turn off the "rollover over this entry" flag.

Element 601 determines if the entry is in a restart status. If the entry is not in restart, element 602 determines if this entry has rolled over the one million ISN value before. If not, element 603 determines if the current ISN being processed is equal to 0. Element 604 determines if the previous ISN is greater than 999,600 and element 605 determines if the current ISN is less than 300. If the ISN is 0, element 606 will set the "rollover during this entry" flag, and element 607 will increment all ISN modifiers that are less than 9 and write the data to the ISN control file. If element 603 determined that the current ISN is not 0, and the previous ISN is greater than 999,600, element 605 will determine if the current ISN is less than 300. If the current ISN is less than 300, then elements 606 and 607 will set the rollover flag and increment the modifier. If element 602 determined that this entry has previously encountered an ISN rollover, element 608 will determine if the current ISN is greater than 5000. If the current ISN is greater than 5000, element 609 will determine if a real item was processed during this entry. Processing a real item is the point of no return that makes this entry permanent from a CPCS perspective. If so, element 610 will clear the "rollover during this entry" flag, effectively making the rollover permanent for this sorter. Logic process 600 exits at block 611.

Figure 7:
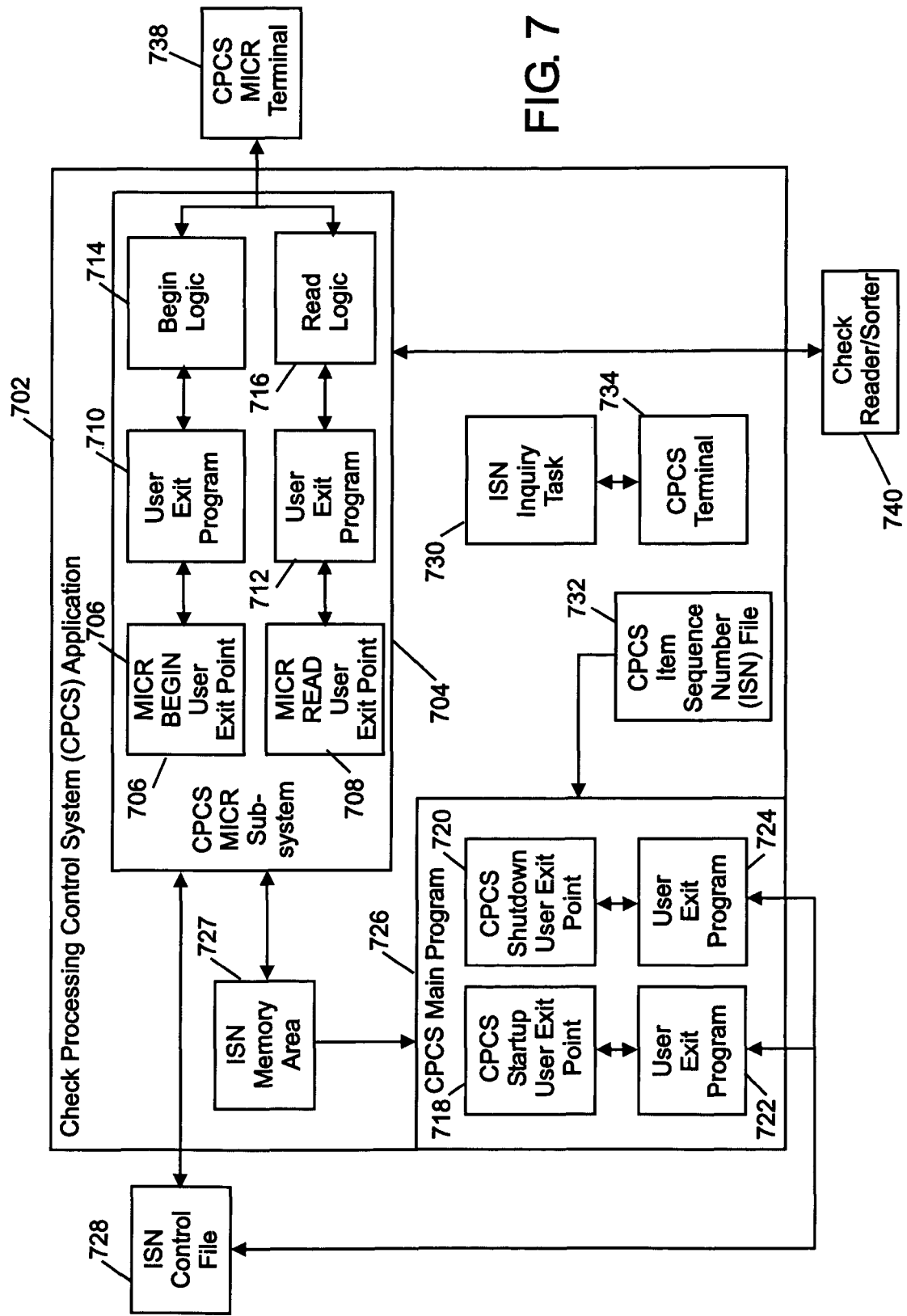
FIG. 7 is a system block diagram illustrating some of the hardware and software details of an example embodiment of the invention.

FIG. 7 presents a system block diagram according to an embodiment of the invention. The diagram of FIG. 7, as opposed to the one of FIG. 2, emphasizes the detail of the hardware and software entities actually involved in carrying out example embodiments of the invention. System 702 is the IBM CPCS application. Within the application is MICR subsystem 704, which includes user exit point 706 for the setup or begin logic, and user exit point 708 for the read logic. These exit points invoke user exit programming 710 and 712, respectively, which in turn call or use the begin logic, 714, and read logic, 716, the details of which have been previously discussed. System 702 in this example also includes startup and shutdown exit points, 718 and 720, and their respective exit programming, 722 and 724, all as part of the main CPCS program, 726.

During operation, ISN memory area 727 exists as part of system 702. Otherwise, data that needs to be preserved is kept in ISN control file 728. The CPCS application, 702, in this embodiment also includes ISN inquiry task 730 to query the status of other elements in response to user input, a file maintaining a history of ISN's used, 732, and a terminal, 734, for a check operations supervisor. Supervisor terminal 734 is used to monitor all sorters and all aspects of the system; hence its interface is integral to the CPCS application. A CPCS MICR terminal, 738, is provided as a separate entity. Terminal 738 connects to the MICR subsystem. Check reader/sorter 742 also connects to the MICR subsystem. An operator enters setup data and receives status and warning messages via terminal 738.

As previously suggested, the user terminals shown in FIG. 7 can be used by the system to display a variety of status indications, warning messages, and the like. The design and layout of such displays are a matter of design choice, and one of skill in the art can readily craft a system of display screens to provide the necessary information. For example a main screen can be provided to receive a selection of various options, such as sorter identifiers, ISN memory area or file status, sorter status, etc. A cycle can be selected and information displayed can include, for one or more sorters, force mode status, cycle date in use, current ISN, cycle starting ISN, number of items remaining before entry restriction occurs, buffer value ISN, hard stop value ISN, and overall sorter status for each sorter. A sorter number can be input to retrieve a display showing the current ISN status for all cycles for the requested sorter, showing similar information to that described above. Provision for printing of reports can be provided. Obviously, an option to put a particular sorter in force mode by appropriate input can be enabled when appropriate. Provisions can also be made to allow input and editing of setup information or options for particular sorters. These types of input can be restricted to a supervisor or other appropriate person with standard user verification and password checking techniques. Provisions can also be made for an authorized user to rebuild an ISN memory area or an ISN control file, which may be needed due to an application software change, an application configuration change, or if a problem is encountered.

FIG. 8 is an illustrative example of a sorter status display, 800, showing cycle information for a particular sorter, which is operating according to example embodiments of the invention. Note the sorter number, force mode status, connection node and operator initials are all displayed near the top of the screen. The columns in the main part of the display show the cycle, cycle date, current ISN, start ISN, number of items ("items"), the buffer ISN value, hard stop ISN value, the current ISN modifier for that cycle and the status for that cycle. Status key 802 near the bottom of the screen indicates possible status codes that can be shown in the right-most column of the main part of the display screen. Below the status key is a listing of function key assignments. Function keys are designated as "PF" keys on IBM mainframe terminals.

Note that in this example, the current ISN for all cycles is "0560712956." The last six digits of this number represent the rolling "ISN" that has been discussed throughout this disclosure. As previously discussed, the complete ISN is of the format "ssrtnnnnnn" where ss is the sorter number, r is the region code, t is the item type, and nnnnnn is the rolling number that is referred to as the "ISN" for purposes of this disclosure. In the example of FIG. 8 then, the sorter number is 05, which matches the sorter number at the top of the screen, the region code is 6, and the item type is 0, which is used here to designate a paper item that is to be imaged.

Specific embodiments of an invention are described herein. One or ordinary skill in the financial data processing arts will quickly recognize that the invention can take many forms. For example, a sorting system can easily be designed which departs from the standard IBM CPCS system in many ways, but still maintains the use of industry standard image keys, with six, or more rolling digits where an overrun needs to be accounted for. An embodiment of the invention could still find use in such a system, but may not be implemented by user exit programming. Additionally, user screens and displays, nature and form of status information and warning messages, and the organization of software and hardware elements can have infinite variations. In fact, many embodiments and implementations are possible. The following claims are in no way intended to limit the scope of the invention to specific, example embodiments described herein.

What is claimed is:

1. A method of managing item sequence numbers to prevent overruns in a magnetic ink character recognition (MICR) encoded financial check processing system, the method comprising:
    setting, by a computing device, a buffer size, wherein the buffer size is indicative of how close a current item sequence number (ISN) is permitted to be to an overrun value before restricted processing occurs, wherein the ISN is assigned to a captured MICR-encoded financial check image and is a rolling number having one of six or eight number of digits that increments by one each time a new image of an MICR-encoded financial check is captured;
    receiving, by a computing device, a hard stop range, wherein the hard stop range is indicative of how close a current ISN is permitted to be to the overrun value before all processing stops;
    calculating, by a computing device processor, an ISN buffer value based on the overrun value and the buffer size, wherein the ISN buffer value is the overrun value reduced by the buffer size;
    calculating, by a computing device processor, an ISN hard stop value based on the overrun value and hard stop range, wherein the ISN hard stop value is the overrun value reduced by the hard stop range and the ISN hard stop value is defined as an ISN value at which, when reached during financial check sorter processing, all processing stops;
    restricting, by a computing device processor, during a single processing cycle, a financial check sorter from processing new entries of MICR encoded financial checks when the current ISN exceeds the ISN buffer value, wherein restricting includes providing for a force mode that is defined as manual intervention by an authorized individual that allows new entries of the MICR encoded financial checks to begin when the current ISN is between the ISN buffer value and the ISN hard stop value; and
    stopping, by a computing device processor, the financial check sorter from processing all MICR-encoded financial checks when the current ISN exceeds the ISN hard stop value.

2. The method of claim 1, further comprising providing a status indication with respect to the current ISN and the ISN buffer value.

3. The method of claim 1, further comprising providing a status indication with respect to the current ISN, the ISN buffer value, and the hard stop value.

4. The method of claim 3, wherein the status indication can include a pending hard stop message.

5. The method of claim 1, wherein the current ISN is a modified ISN comprising a standard ISN and an ISN modifier, the ISN modifier providing an indication of an ISN in relation to a rollover value for use in comparing the current ISN to the ISN buffer value and the hard stop value.

6. The method of claim 3, wherein the current ISN is a modified ISN comprising a standard ISN and an ISN modifier, the ISN modifier providing an indication of ISN in relation to a rollover value for use in comparing the current ISN to the ISN buffer value and the hard stop value.

7. The method of claim 4, wherein the current ISN is a modified ISN comprising a standard ISN and an ISN modifier, the ISN modifier providing an indication of an ISN in relation to a rollover value, for use in comparing the current ISN to the ISN buffer value and the hard stop value.

8. A non-transitory computer program product for managing item sequence numbers to prevent overruns in a magnetic ink character recognition (MICR) encoded financial check processing system, the non-transitory computer program product including computer program code comprising:
    instructions for calculating and item sequence number (ISN) buffer value as an overrun value reduced by a buffer size, wherein the ISN is assigned to a captured MICR-encoded financial check image and is a rolling number having one of six or eight number of digits that increments by one each time a new image of an MICR-encoded financial check is captured and wherein the buffer size is indicative of how close a current ISN is permitted to be to an overrun value before processing of financial checks is restricted; and
    instructions for calculating a ISN hard stop (HS) value as the overrun value reduced by a hard stop range, wherein the hard stop range is indicative of how close a current ISN is permitted to be to an overrun value before processing of financial checks is stopped and the ISN hard stop value is defined as an ISN value at which, when reached during financial check sorter processing, all processing stops;
    instructions for restricting, during a single processing cycle, a financial check sorter from processing new entries of MICR encoded financial checks when the current ISN exceeds the ISN buffer value, wherein restricting includes providing for a force mode that is defined as manual intervention by an authorized individual that allows new entries of the MICR encoded financial checks to begin when the current ISN is between the ISN buffer value and the ISN hard stop value; and
    instructions for stopping the financial check sorter from processing all MICR-encoded financial checks when the current ISN exceeds the ISN hard stop value.

9. The non-transitory computer program product of claim 8, wherein the computer program code further comprises instructions for providing a status indication with respect to the current ISN and the ISN buffer value.

10. The non-transitory computer program product of claim 8, wherein the computer program code further comprises instructions for providing a status indication with respect to the current ISN, the ISN buffer value, and the hard stop value.

11. The non-transitory computer program product of claim 10, wherein the status indication can include a pending hard stop message.

12. The non-transitory computer program product of claim 8, wherein the current ISN can be a modified ISN comprising a standard ISN and an ISN modifier, the ISN modifier providing an indication of an ISN in relation to a rollover value for use in comparing the current ISN to the ISN buffer value and the hard stop value.

13. The non-transitory computer product of claim 9, wherein the current ISN can be a modified ISN comprising a standard ISN and an ISN modifier, the ISN modifier providing an indication of an ISN in relation to a rollover value for use in comparing the current ISN to the ISN buffer value.

14. The non-transitory computer program product of claim 10, wherein the current ISN can be a modified ISN comprising a standard ISN and an ISN modifier, the ISN modifier providing indication of an ISN in relation value, for use in comparing the current ISN to the ISN buffer value and the hard stop value.

15. The non-transitory computer program product of claim 11, wherein the current ISN can be a modified ISN comprising a standard ISN and an ISN modifier, the ISN modifier providing an indication of an ISN in relation to a rollover value, for use in comparing the current ISN to the ISN buffer value and the hard stop value.

16. Apparatus for managing item sequence numbers to prevent overruns in a magnetic ink character recognition (MICR) encoded financial check processing system, the apparatus comprising:
  means for calculating and item sequence number (ISN) buffer value as an overrun value reduced by a buffer size, wherein the ISN is assigned to a captured MICR-encoded financial check image and is a rolling number having one of six or eight number of digits that increments by one each time a new image of an MICR-encoded financial check is captured and wherein the buffer size is indicative of how close a current ISN is permitted to be to an overrun value before processing of financial checks is restricted;
  means for calculating a ISN hard stop (HS) value as the overrun value reduced by a hard stop range, wherein the hard stop range is indicative of how close a current ISN is permitted to be to an overrun value before processing of financial checks is stopped and the ISN hard stop value is defined as an ISN value at which, when reached during financial check sorter processing, all processing stops; and
  means for restricting, during a single processing cycle, a financial check sorter from processing new entries of MICR encoded financial checks when the current ISN exceeds the ISN buffer value, wherein restricting includes providing a force mode that is defined as manual intervention by an authorized individual that allows new entries of the MICR encoded financial checks to begin when the current ISN is between the ISN buffer value and the ISN hard stop value; and
  means for stopping the financial check sorter from processing all MICR-encoded financial checks when the current ISN exceeds the ISN hard stop value.

17. The apparatus of claim 16, further comprising means for providing a status indication with respect to the current ISN and the ISN buffer value.

18. The apparatus of claim 16, further comprising means for providing a status indication with respect to the current ISN, the ISN buffer value, and the hard stop value.

* * * * *